United States Patent
Sano

(10) Patent No.: US 7,330,171 B2
(45) Date of Patent: Feb. 12, 2008

(54) AMPLIFIER CIRCUIT

(75) Inventor: Keiichi Sano, Taipei (TW)

(73) Assignee: Sanyo Electric Co., Ltd., Osaka (JP)

( * ) Notice: Subject to any disclaimer, the term of this patent is extended or adjusted under 35 U.S.C. 154(b) by 646 days.

(21) Appl. No.: 10/872,819

(22) Filed: Jun. 22, 2004

(65) Prior Publication Data

US 2005/0018503 A1 Jan. 27, 2005

(30) Foreign Application Priority Data

Jun. 23, 2003 (JP) .............................. 2003-177516
May 13, 2004 (JP) .............................. 2004-143905

(51) Int. Cl.
*G09G 3/36* (2006.01)
(52) U.S. Cl. ........................................ 345/98; 345/100
(58) Field of Classification Search .................. 345/98, 345/100; 330/253; 327/558
See application file for complete search history.

(56) References Cited

U.S. PATENT DOCUMENTS

| | | | | |
|---|---|---|---|---|
| 5,243,333 A | * | 9/1993 | Shiba et al. ................. | 345/100 |
| 5,721,563 A | * | 2/1998 | Memida ........................ | 345/98 |
| 6,107,980 A | * | 8/2000 | Hermanns et al. ............. | 345/90 |
| 6,114,907 A | * | 9/2000 | Sakurai ....................... | 330/253 |
| 6,331,847 B1 | * | 12/2001 | Kim et al. ................... | 345/100 |
| 6,388,511 B1 | * | 5/2002 | Kanao ......................... | 327/558 |

FOREIGN PATENT DOCUMENTS

JP 2000-081606 3/2000

OTHER PUBLICATIONS http://en.wikipedia.org/wiki/Complementary_metal-oxide_semiconductor.*

* cited by examiner

*Primary Examiner*—Richard Hjerpe
*Assistant Examiner*—Kevin M Nguyen
(74) *Attorney, Agent, or Firm*—Morrison & Foerster LLP

(57) ABSTRACT

A signal sampled by a sampling transistor is amplified with low power consumption. A display voltage signal Vsig sampled by the sampling transistor is amplified by an amplifier circuit of this invention. A thin film transistor T1 which functions as a MOS capacitance is connected to a signal line DL to which the display voltage signal Vsig is outputted. A voltage boosting pulse VP1 is applied to a gate of the thin film transistor T1. And the thin film transistor T1 is switched from ON to OFF during change in the rising pulse. The amplifier circuit amplifies the signal through the use of difference between the gate capacitance of the thin film transistor T1 in ON state and the gate capacitance of the thin film transistor T1 in OFF state.

17 Claims, 8 Drawing Sheets

AMPLIFIER CIRCUIT

CROSS-REFERENCE OF THE INVENTION

This invention is based on Japanese Patent Application Nos. 2003-177516 and 2004-143905, the content of which is incorporated by reference in its entirety.

BACKGROUND OF THE INVENTION

1. Field of the Invention

This invention relates to an amplifier circuit, specifically to an amplifier circuit to amplify a signal taken by a sampling transistor.

2. Description of the Related Art

An active matrix type LCD (Liquid Crystal Display) device and an organic EL (Electroluminescence) display device having an integrated drive circuit are previously known. This type of display device includes a pixel area in which pixels are arrayed in a matrix with m rows and n columns and the drive circuit disposed in its periphery. The display device is provided with a display voltage signal externally.

A wide range of the display voltage signal is used for the display device in order to enhance contrast of the LCD or brightness of organic EL elements. And a wide range of display signal output voltage is set in an external circuit (such as a peripheral LSI) of the display device to comply with such a requirement.

Required large display signal voltage described above is unfavorable to reduction in power consumption. Japanese Patent Application Publication No. 2000-81606, for example, describes a technology to reduce the power consumption which uses a driving method such as common inversion drive or sub-capacitor drive to reduce the display signal voltage and to reduce power supply voltage of the external drive circuit.

When applying the display voltage signal to the display device, it is necessary that an input load on the display device side, i.e. a display signal line for example, is driven enough. However, when the wide range of display voltage required for the display device is used as mentioned above, there is a problem that requirements of the wide voltage range and large driving capacity on the external circuit of the display device increase power consumption.

SUMMARY OF THE INVENTION

This invention is directed to offer a low power consumption amplifier circuit which can be integrated into a display device. The amplifier circuit of this invention amplifies a signal taken by a sampling transistor. A signal line to which the signal is outputted is connected with a MOS transistor which works as a MOS capacitance. A pulse is applied to a gate or a drain and a source of the MOS transistor. And the MOS transistor is turned from ON to OFF during change in the pulse over time. The amplifier circuit amplifies the signal through the use of difference in the MOS capacitance between ON state and OFF state.

DETAILED DESCRIPTION OF THE INVENTION

Figure 1:
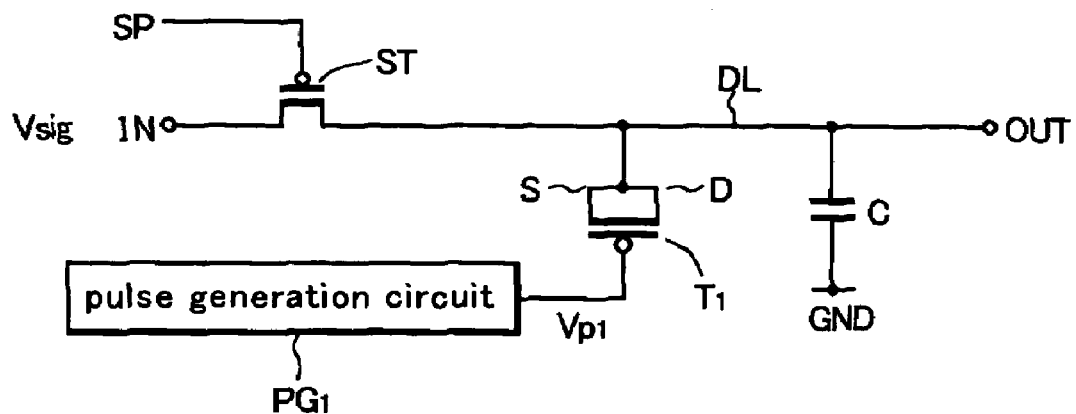
FIG. 1 is a circuit diagram of an amplifier circuit according to a first embodiment of this invention.

Next, an amplifier circuit according to a first embodiment of this invention will be explained referring to figures. FIG. 1 is a circuit diagram of the amplifier circuit. The amplifier circuit is applied to a liquid crystal display device or an organic EL display device. A display voltage signal Vsig is inputted to an input terminal IN which is a drain of a sampling transistor ST. The sampling transistor ST is, for example, a P-channel type thin film transistor.

A sampling signal SP is applied to a gate of the sampling transistor ST. A source of the sampling transistor ST is connected to a drain signal line DL. An output terminal OUT of the drain signal line DL is connected to a plurality of pixels which is not shown in the figure. The drain signal line DL has a parasitic capacitance C.

A P-channel type thin film transistor T1 works as a MOS capacitance and has a channel region formed in an active layer made of a poly silicon layer, a source S and a drain D each formed at each end of the channel region, a gate insulation film and a gate electrode formed on the gate insulation film. The source S and the drain D of the thin film transistor T1 are connected to the drain signal line DL. A voltage boosting pulse VP1 generated from a pulse generation circuit PG1 is applied to the gate of the thin film transistor T1. The thin film transistor T1 may have a structure in which the source S and the drain D are unified (a structure having the channel region and the source (the drain) as a lead electrode).

Figure 2:
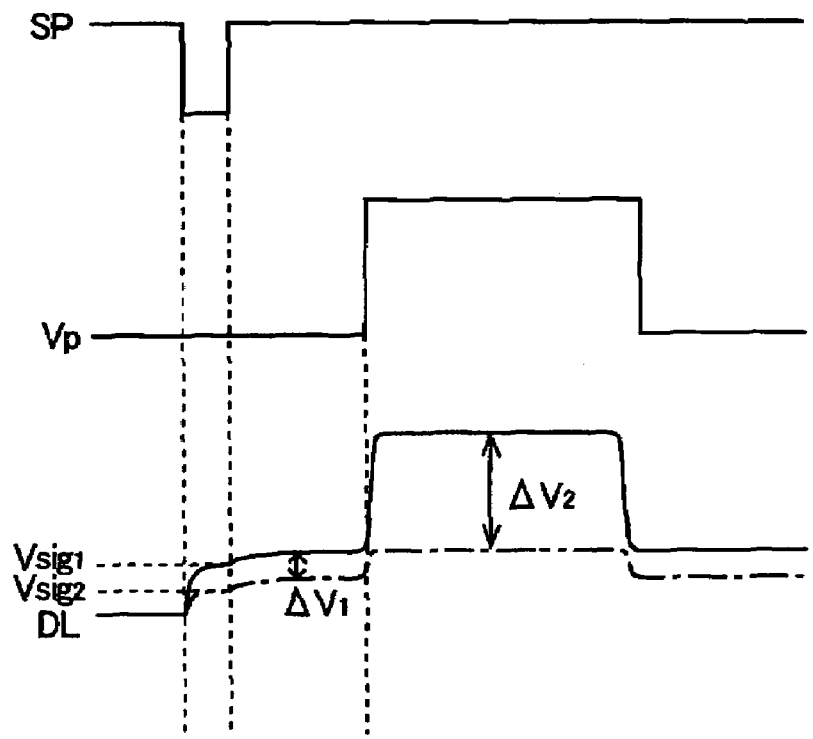
FIG. 2 is an operation waveform chart of the amplifier circuit according to the first embodiment of this invention.

FIG. 2 is an operation waveform chart of the amplifier circuit. The sampling transistor ST is turned ON and the display voltage signal Vsig is inputted to the drain signal line DL through the sampling transistor ST in a period during which the sampling signal SP is at low level. The sampling transistor ST is turned OFF when the sampling signal SP turns to high level. With this, the drain signal line is put in a floating state and the sampled display voltage signal Vsig is maintained with the parasitic capacitance C of the drain signal line DL.

After that, the voltage boosting pulse VP1 is generated from the pulse generation circuit PG1 and a rising pulse is applied to the gate of the thin film transistor T1. Whereupon the drain signal line DL is pushed up by capacitive coupling due to a gate capacitance held by the thin film transistor T1. The display voltage signal Vsig can be amplified during change in a level of the rising pulse over time, utilizing a difference in the gate capacitance which depends on a level of the inputted display voltage signal Vsig.

That is, assuming that a voltage difference between the display signal voltages Vsig1 and Vsig2 is ΔV1 before the rise of the voltage boosting pulse VP1, the voltage difference after the rise of the voltage boosting pulse VP1 becomes ΔV2 (ΔV2>ΔV1). The amplified display voltage signal Vsig, i.e. a voltage at the drain signal line DL is outputted from the output terminal OUT and is applied to one of the pixels. Then the voltage difference returns to ΔV1 after the voltage boosting pulse VP1 falls.

Figure 3:
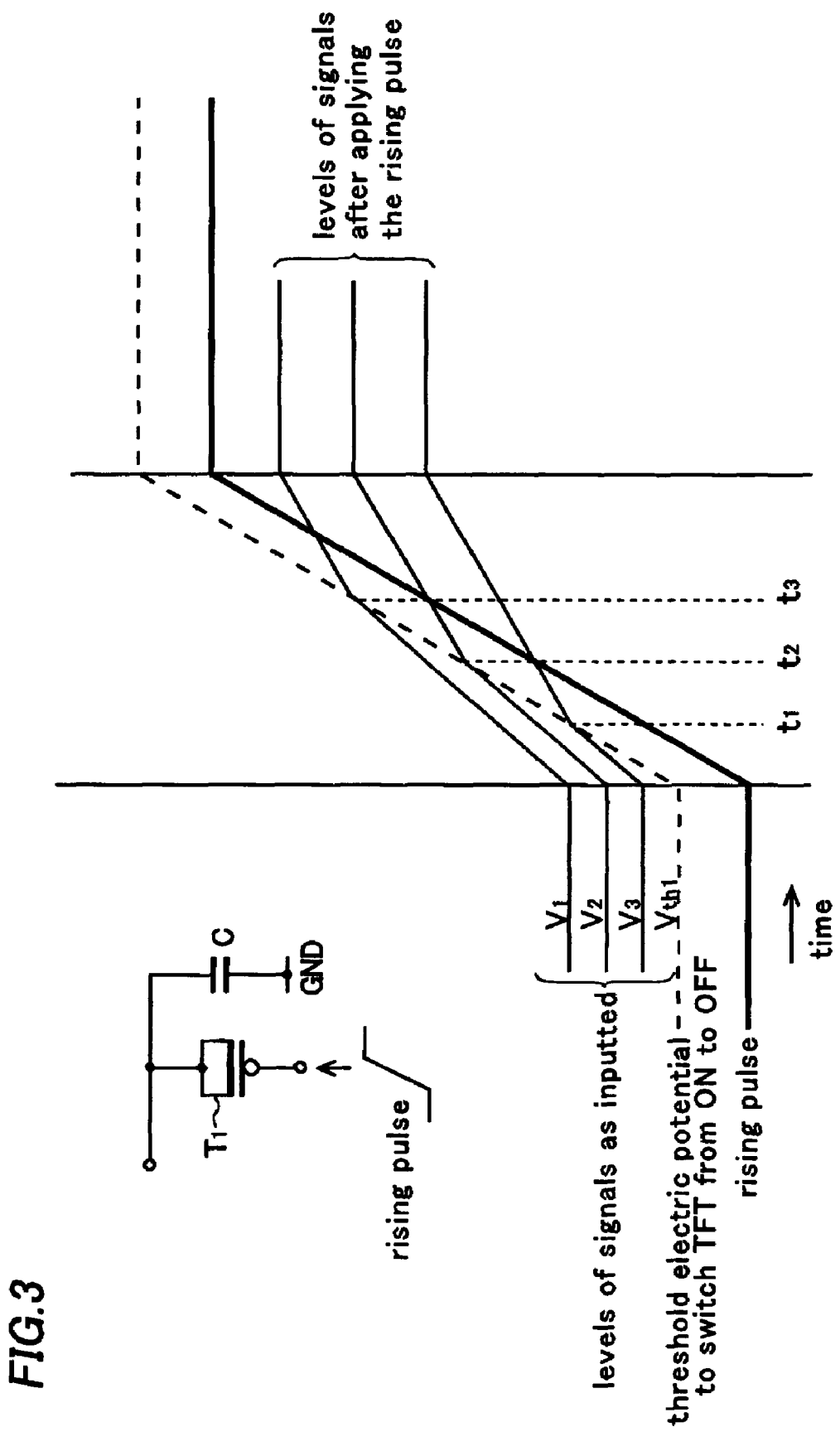
FIG. 3 is an operation waveform chart of the amplifier circuit according to the first embodiment of this invention.

FIG. 3 is a detailed operation waveform chart of the amplifier circuit. The amplification by the amplifier circuit will be explained more in detail referring to the figure. Levels of the display voltage signal Vsig are denoted by V1, V2 and V3 in FIG. 3, assuming V1>V2>V3. And an absolute value of a threshold voltage of the thin film transistor T1 is denoted by Vt1. The thin film transistor T1 is turned ON when an electric potential at the source and drain of the thin film transistor T1 is equal to or higher than a threshold electric potential Vth1 which is equal to VP1+Vt1.

The thin film transistor T1 is turned ON before generation of the rising pulse, since electric potential at the source and drain of the thin film transistor T1 is higher than the threshold electric potential Vth1. When the rising pulse begins rising, i.e., the start of the transition period of the pulse, the threshold electric potential Vth1 rises similarly. On the other hand, although the levels of the display voltage signal Vsig rise due to the effect of the capacitive coupling through the gate capacitance, the rates of their rise are smaller than that of the threshold electric potential Vth1 because of the parasitic capacitance C. Therefore lines of the display voltage signal Vsig representing changes in the levels of the display voltage signal Vsig over time eventually intersect a line of the threshold electric potential Vth1 representing a change in the threshold electric potential Vth1 over time.

When each of the lines of the display voltage signal Vsig intersects the line of the threshold electric potential Vth1, the electric potential at the gate of the thin film transistor T1 is lower than each of the levels V1, V2 and V3 of the display voltage signal Vsig by the threshold voltage Vt1, respectively. The thin film transistor T1 turns OFF at this point of time.

And the gate capacitance is reduced after the intersection, because the thin film transistor T1 is turned OFF. This is because an inversion layer disappears and a depletion region appears in the channel region of the thin film transistor T1 to make the gate capacitance a series capacitance of a gate insulation film capacitance and a depletion layer capacitance when the thin film transistor T1 is turned OFF, while there is an inversion layer in the channel region when the thin film transistor T1 is turned ON and the gate capacitance is determined by the gate insulation film capacitance.

The gradient of each of the lines of the display voltage signal Vsig is reduced when the gate capacitance is reduced, because the effect of the capacitive coupling is reduced.

A period during which the thin film transistor T1 is turned ON (or turned OFF) during the change in the level of the rising pulse varies depending on the level of the display voltage signal Vsig when it is inputted, as shown in FIG. 3. That is, the period during which the thin film transistor T1 is turned ON varies with V1, V2 and V3 in descending order, since the line representing a change in the lowest level V3 intersects the line of the threshold electric potential Vth1 at time t1 first, the line representing a change in V2 intersects the threshold electric potential Vth1 next at time t2 and then the line representing a change in the highest level V1 intersects the line of the threshold electric potential Vth1 at time t3. The period during which the thin film transistor T1 is turned OFF varies with V1, V2 and V3 in ascending order on the contrary.

Because of the above, each of the differences between each two of the levels V1, V2 and V3 of the display voltage signal Vsig after applying the rising pulse is increased compared with corresponding each of those before applying the rising pulse. In other words, a range of the display voltage signal Vsig can be expanded according to this amplifier circuit.

Note that an N-channel type thin film transistor may be used instead of the P-channel type thin film transistor T1 which is used in the embodiment. A pulse having opposite polarity to the voltage boosting pulse VP1 is applied in this case. That is, the N-channel type thin film transistor is switched from ON to OFF during change in a level of a falling pulse.

Figure 4:
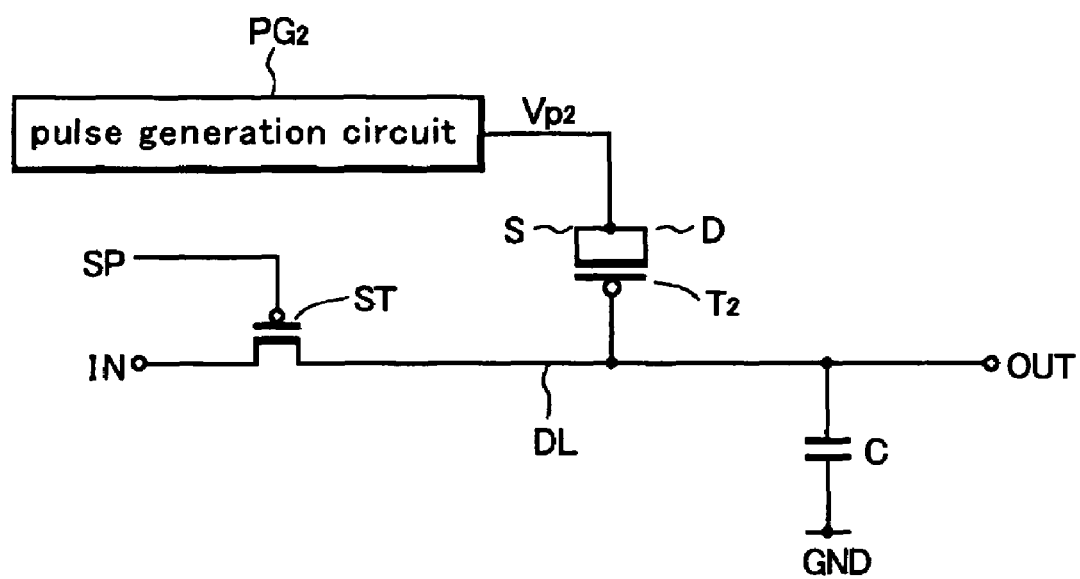
FIG. 4 is a circuit diagram of an amplifier circuit according to a second embodiment of this invention.

Next, an amplifier circuit according to a second embodiment of this invention will be explained referring to figures. FIG. 4 is a circuit diagram of the amplifier circuit. Differences from the first embodiment are that a gate of a thin film transistor T2 is connected to a drain signal line DL and that a voltage boosting pulse VP2 generated from a pulse generator PG2 is applied to a source S and a drain D of the thin film transistor T2. The voltage boosting pulse VP2 is opposite to the voltage boosting pulse VP1 in the first embodiment in polarity.

Figure 5:
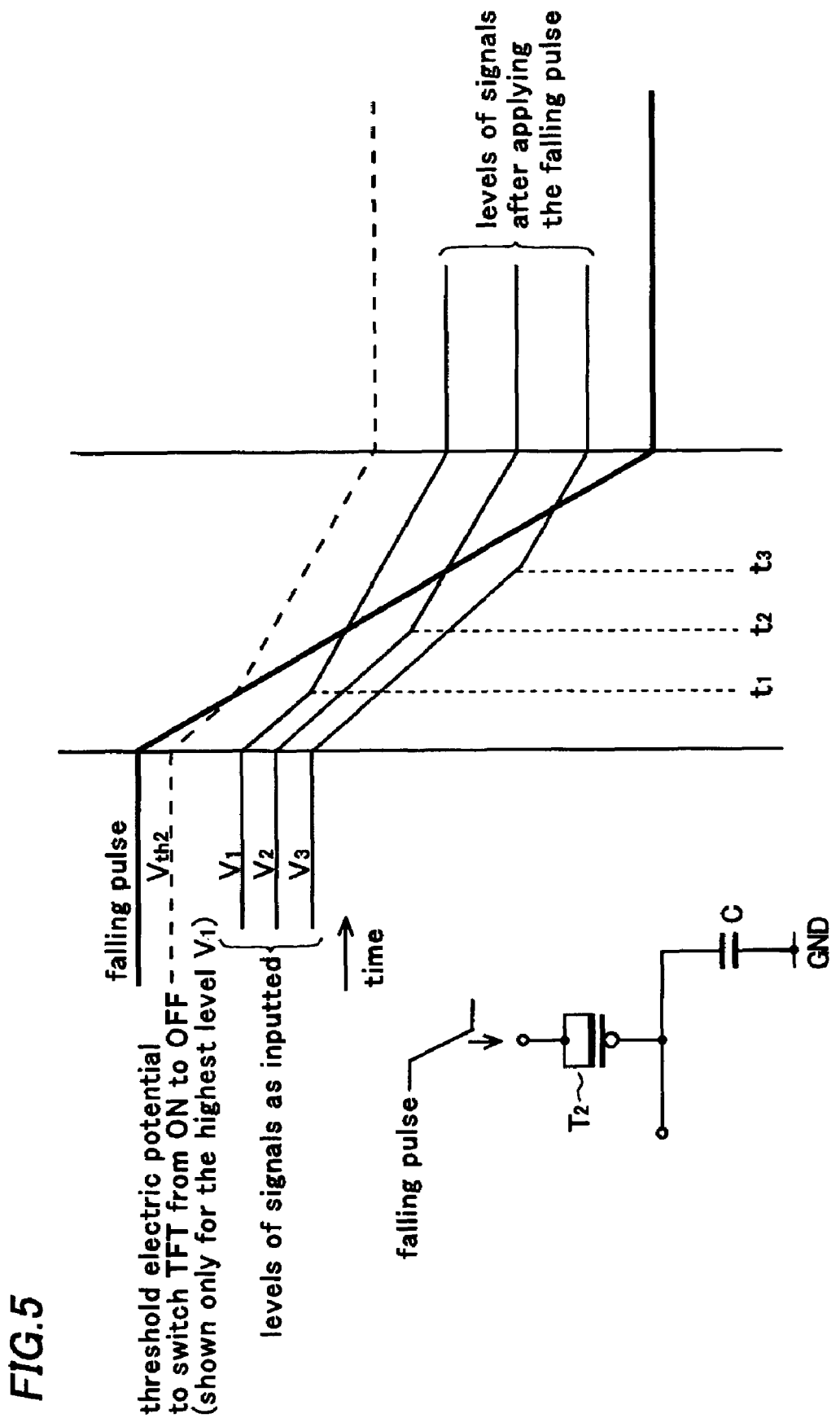
FIG. 5 is an operation waveform chart of the amplifier circuit according to the second embodiment of this invention.

FIG. 5 is a detailed operation waveform chart of the amplifier circuit. The operation of the amplifier circuit will be explained more in detail referring to the figure. Levels of the display voltage signal Vsig are denoted by V1, V2 and V3 in FIG. 5, assuming V1>V2>V3. And an absolute value of a threshold voltage of the thin film transistor T2 is denoted by Vt2. The thin film transistor T2 is turned ON when an electric potential at the source and drain of the thin film transistor T2 is equal to or higher than a threshold electric potential Vth2 which is equal to Vsig+Vt2.

An electric potential at the gate of the thin film transistor T2 is equal to each of the levels V1, V2 and V3 of the display voltage signal Vsig in this embodiment. The thin film transistor T2 is turned ON before generation of the falling pulse, since the electric potential at the source and the drain of the thin film transistor T2 is higher than the threshold electric potential Vth2 for any of the levels V1, V2 and V3.

The threshold electric potential Vth2 varies with levels V1, V2 and V3 of the display voltage signal Vsig in this embodiment. FIG. 5 shows the threshold electric potential Vth2 corresponding to the highest level V1.

When the falling pulse begins falling, i.e., the start of the transition period of the pulse, the threshold electric potential Vth2 and levels V1, V2 and V3 of the display voltage signal Vsig also fall accordingly. In the case where the level of the display voltage signal Vsig is V1, the thin film transistor T2 switches from ON to OFF at time t1 when a line representing a change in the threshold electric potential Vth2 for the level V1 of the display voltage signal Vsig intersects a line of the falling pulse representing a change in the falling pulse.

Similarly in the case where the level of the display voltage signal Vsig is V2, the thin film transistor T2 switches from ON to OFF at time t2 when a line representing a change in the threshold electric potential Vth2 for the level V2 of the display voltage signal Vsig intersects the line of the falling pulse, and then the thin film transistor T2 switches from ON to OFF at time t3 when a line representing a change in the threshold electric potential Vth2 for the level V3 of the display voltage signal Vsig intersects the line of the falling pulse in the case where the level of the display voltage signal Vsig is V3.

A period during which the thin film transistor T2 is turned ON varies with V1, V2 and V3 in ascending order on the contrary to the first embodiment. A period during which the thin film transistor T2 is turned OFF varies with V1, V2 and V3 in descending order on the other hand. Because of the above, each of the differences between each two of the levels V1, V2 and V3 of the display voltage signal Vsig after applying the falling pulse is increased compared with corresponding each of those before applying the falling pulse. In other words, a range of the display voltage signal Vsig can be expanded according to this amplifier circuit.

Note that an N-channel type thin film transistor may be used instead of the P-channel type thin film transistor T2 which is used in the embodiment. A pulse having opposite polarity to the voltage boosting pulse VP2 is applied in this case. That is, the N-channel type thin film transistor is switched from ON to OFF during change in a level of a rising pulse.

Figure 6:
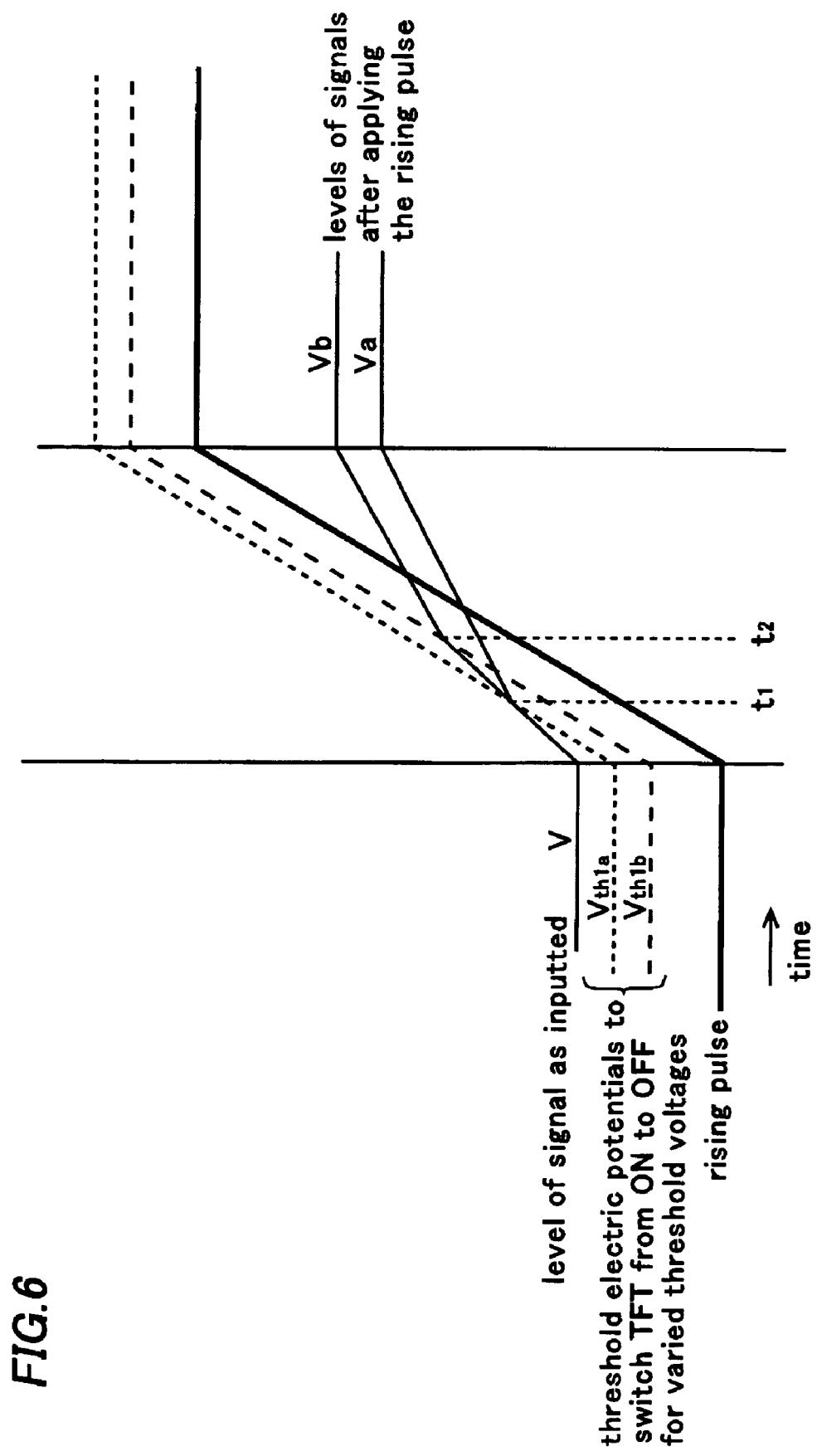
FIG. 6 is an operation waveform chart to explain influence of a variation in a threshold voltage on the amplifier circuit according the first embodiment of this invention.

There is a problem in the first embodiment described above that the level after the amplification varies when the threshold voltage Vt1 of the thin film transistor T1 varies. This is the same in the second embodiment. A cause of the problem will be explained referring to FIG. 6. The thin film transistor T1 switches from ON to OFF at the intersection between the line of the display voltage signal Vsig and the line of the threshold electric potential in the first embodiment.

Now it is assumed that the threshold voltage varies among circuits and an absolute value of the threshold voltage is Vt1$a$ in one circuit and Vt1$b$ in another (Vt1$a$>Vt1$b$). In the case where the threshold voltage is Vt1$a$, the thin film transistor T1 is turned ON when an electric potential at the source and drain of the thin film transistor T1 is equal to or higher than a threshold electric potential Vth1$a$ which is equal to VP1+Vt1$a$. The thin film transistor T1 switches from ON to OFF at time t1 when the line of the display voltage signal Vsig intersects a line representing a change in the threshold electric potential Vth1$a$. In the case where the threshold voltage is Vt1$b$, the thin film transistor T1 is turned ON when an electric potential at the source and drain of the thin film transistor T1 is equal to or higher than a threshold electric potential Vth1$b$ which is equal to VP1+Vt1$b$. The thin film transistor T1 switches from ON to OF at time t2 (t2>t1) when the line of the display voltage signal Vsig intersects a line representing a change in the threshold electric potential Vth1$b$. Because of this, the levels of the display voltage signal Vsig after applying the rising pulse for the two cases described above become Va and Vb which are different from each other.

Figure 7:
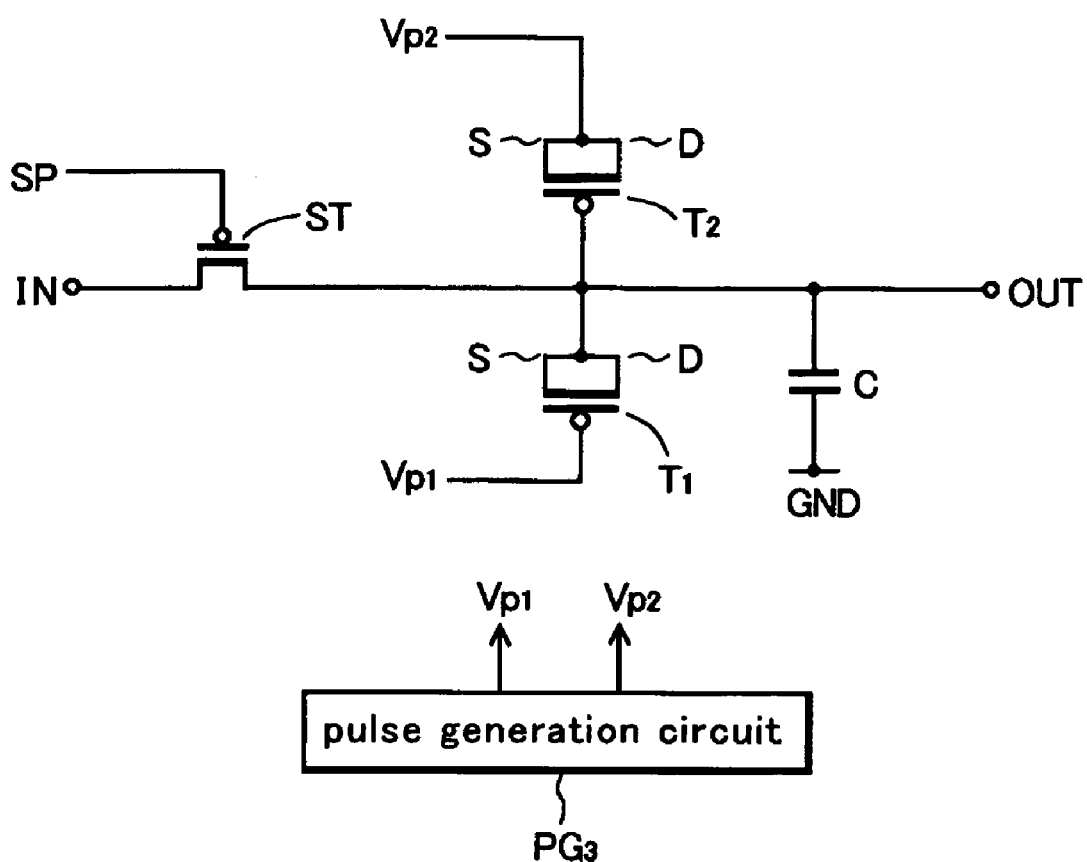
FIG. 7 is a circuit diagram of an amplifier circuit according to a third embodiment of this invention.

With this being the situation, a third embodiment of this invention hereinafter described is to offer an amplifier circuit to solve the problem addressed above. FIG. 7 is a circuit diagram of the amplifier circuit. The thin film transistor T1 used in the first embodiment and the thin film transistor T2 used in the second embodiment are combined in the circuit in the third embodiment. A pulse generation circuit PG3 generates voltage boosting pulses VP1 and VP2.

Figure 8:
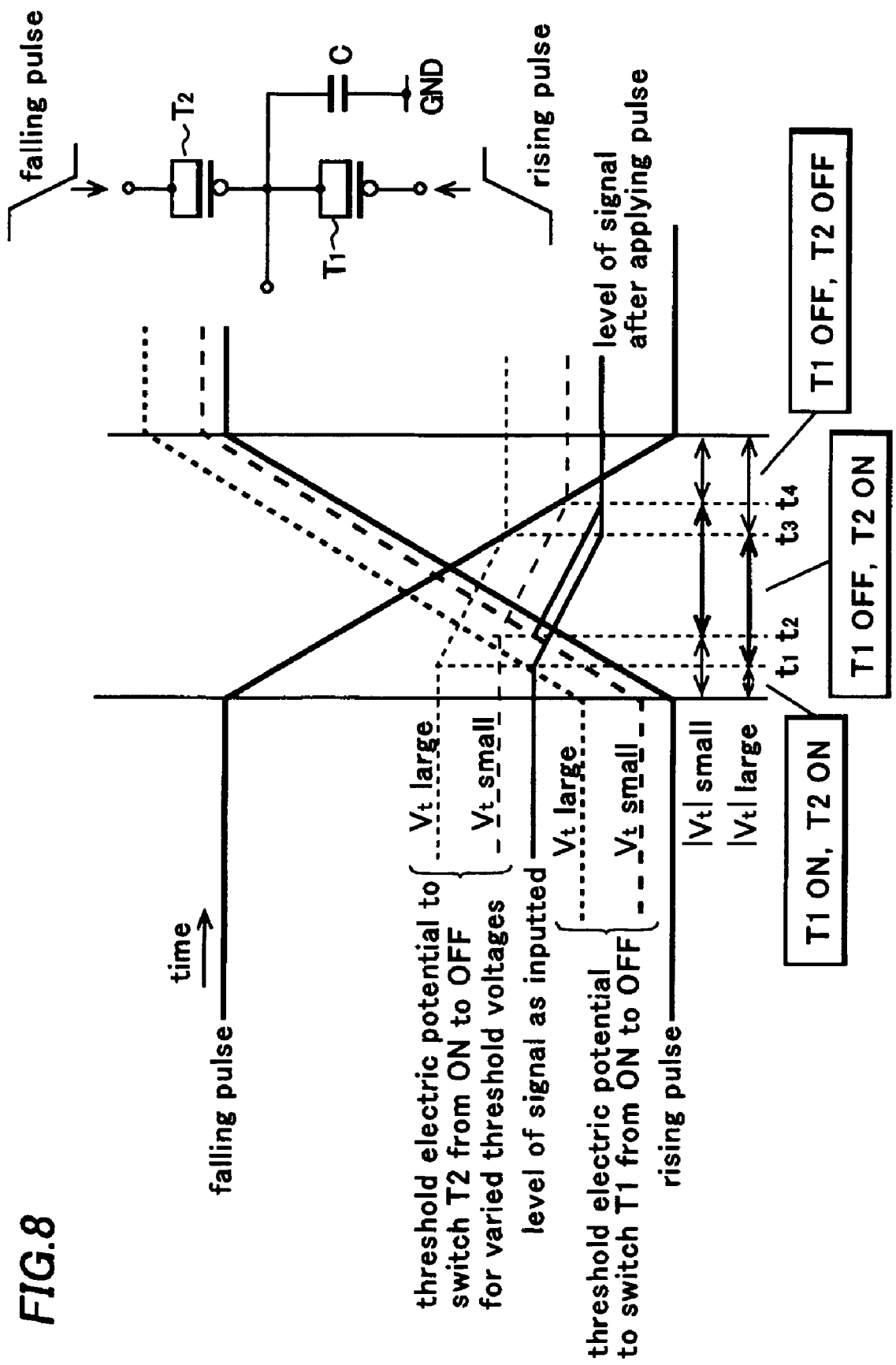
FIG. 8 is an operation waveform chart of the amplifier circuit according to the third embodiment of this invention.

FIG. 8 is an operation waveform chart of the amplifier circuit. The operation of the amplifier circuit will be explained in detail referring to the figure. Here it is assumed that the thin film transistor T1 and the thin film transistor T2 have equal amount of gate capacitance to each other when they are turned ON and also when they are turned OFF. And the thin film transistor T1 and the thin film transistor T2 are assumed to be placed adjacent to each other having an equal threshold voltage Vt. Also assumed is that the voltage boosting pulses VP1 and VP2 are opposite in polarity to each other and are mirror images of each other.

When an absolute value of the threshold voltage Vt is large, a line of the threshold electric potential of the thin film transistor T1 representing a change in the threshold electric potential of the thin film transistor T1 and a line of the display voltage signal Vsig representing a change in the display voltage signal Vsig intersect at time t1 at which the thin film transistor T1 switches from ON to OFF, and a line of the falling pulse representing a change in the falling pulse and a line of a threshold electric potential of the thin film transistor T2 representing a change in the threshold electric potential of the thin film transistor T2 intersect at later time t3 at which the thin film transistor T2 switches from ON to OFF.

Both the thin film transistors T1 and T2 are turned ON before the time t1. The thin film transistor T1 is turned OFF and the thin film transistor T2 is turned ON in a period between the time t1 and the time t3.

Both the thin film transistors T1 and T2 are turned OFF after the time t3. When both thin film transistors T1 and T2 are turned ON or OFF, the display voltage signal Vsig does not vary as the gate capacitances of the thin film transistors T1 and T2 are equal to each other and the rising pulse and the falling pulse are opposite in polarity to each other and mirror images of each other thus canceling influence of these pulses on the display voltage signal Vsig.

And during the period between the time t1 and the time t3, the display voltage signal Vsig falls since the gate capacitance of the thin film transistor T2 is larger than the gate capacitance of the thin film transistor T1 making the falling pulse dominant.

On the other hand, when the absolute value of the threshold voltage Vt is small, the line of the threshold electric potential of the thin film transistor T1 and the line of the display voltage signal Vsig intersect at time t2 at which the thin film transistor T1 switches from ON to OFF, and the line of the falling pulse and the line of the threshold electric potential of the thin film transistor T2 intersect at later time t4 at which the thin film transistor T2 switches from ON to OFF.

From consideration similar to the described above, the display voltage signal Vsig falls in a period between the time t2 and the time t4. The period during which the display voltage signal Vsig falls simply varies depending on the value of the threshold voltage Vt and the variation in the display voltage signal Vsig after applying the pulse on the varying threshold voltage Vt can be reduced.

A total period during which both the thin film transistors T1 and T2 are turned ON or OFF, i.e., a period during which the effect of the rising pulse cancels the effect of the falling pulse, does not vary with the value of the threshold voltage Vt. The period during which the thin film transistor T2 is turned ON and the thin film transistor T1 is turned OFF, i.e., the period during which the display voltage signal Vsig falls, also does not vary with the value of the threshold voltage Vt. Therefore the display voltage signal Vsig after applying the pulses can be made independent of the variation in the threshold voltage Vt.

The display voltage signal Vsig is lower than a center value of the voltage boosting pulse in the embodiment described above. When the display voltage signal Vsig is higher than the center value of the voltage boosting pulse, there arises a period in which the thin film transistor T2 is turned OFF while the thin film transistor T1 is turned ON.

In this case, which is not shown in the figure, the display voltage signal Vsig rises. Although the voltage boosting pulses VP1 and VP2 are assumed to be mirror images of each other in the embodiment for convenience of explanation, the influence of the pulses is due to variation in the voltage and similar effect is expected even in cases where the pulses are not matched or waveforms of the pulses are distorted.

Next, a fourth and a fifth embodiments of this invention will be explained. The amplifier circuits to amplify the display voltage signal inputted to the drain signal line are described in the preceding embodiments. This invention can also be applied to an amplifier circuit to amplify the display voltage signal inputted to pixels of the display device.

Figure 9:
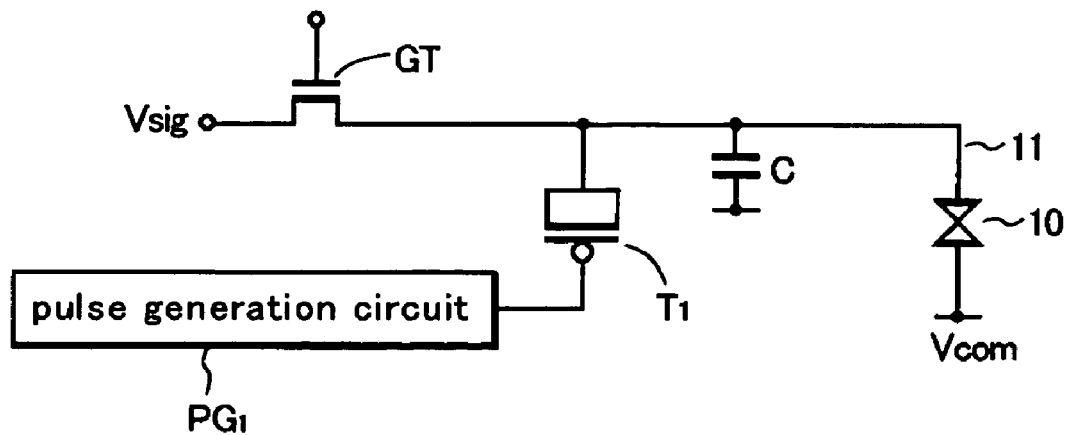
FIG. 9 is a circuit diagram of an amplifier circuit according to a fourth embodiment of this invention.

FIG. 9 is a circuit diagram of an amplifier circuit according to the fourth embodiment of this invention. The amplifier circuit is provided at a pixel of a liquid crystal display device. The display voltage signal Vsig from the drain signal line is applied to a drain of a pixel selection transistor GT. A gate scanning signal is applied to a gate of the pixel selection transistor GT including an N-channel type thin film transistor. The pixel selection transistor GT operates as a type of sampling transistor. The display voltage signal Vsig taken into the pixel is retained with a holding capacitance C and is applied to a pixel electrode 11 of a liquid crystal 10.

A thin film transistor T1 and a pulse generation circuit PG1 are provided. A voltage boosting pulse VP1 generated by the pulse generation circuit PG1 is applied to a gate of the thin film transistor T1. The operation of the amplifier circuit of this embodiment is similar to that of the amplifier circuit of the first embodiment. Also, a thin film transistor T2 may be provided as in the second embodiment, or both the thin film transistor T1 and the thin film transistor T2 may be provided as in the third embodiment.

Figure 10:
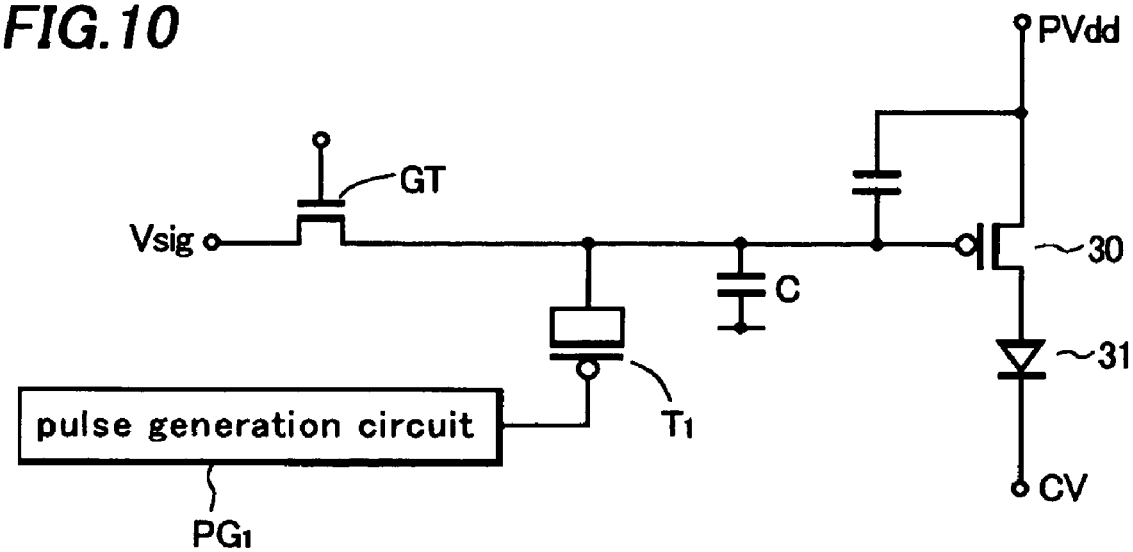
FIG. 10 is a circuit diagram of an amplifier circuit according to a fifth embodiment of this invention.

FIG. 10 is a circuit diagram of an amplifier circuit according to the fifth embodiment of this invention. The amplifier circuit is applied to a pixel of an organic EL display device. A source of the pixel selection transistor GT is connected to a gate of a transistor 30 to drive the pixel of the organic EL. The transistor 30 to drive the pixel of the organic EL includes a P-channel thin film transistor. A source of the transistor 30 is connected to a positive power supply PVdd and a drain of the transistor 30 is connected to an anode of an organic EL element 31. A cathode of the organic EL element 31 is connected to a negative power supply CV. The rest of the structure is similar to that of the fourth embodiment.

The signal sampled by the sampling transistor can be amplified with low power consumption according to the amplifier circuit of this invention. The amplifier circuit of this invention is particularly suited as an amplifier circuit integrated in a display device and used to amplify a display voltage signal outputted to a display signal line.

What is claimed is:

1. An amplifier circuit comprising:
   a sampling transistor;
   a signal line to which a signal sampled by the sampling transistor is inputted;
   a MOS transistor receiving the sampled signal and comprising a source and a drain that are connected together so as to be connected to the signal line; and
   a pulse generation circuit generating a pulse and applying the pulse to a gate of the MOS transistor, the pulse generating circuit changing an electric potential of the pulse during a transition period of the pulse so that the MOS transistor turns off during the transition period,
   wherein the MOS transistor is configured to amplify the received signal upon the application of the pulse to the gate of the MOS transistor.

2. The amplifier circuit of claim 1, wherein, during the change in the electric potential of the pulse, the signal, which changes in response to the change in the electric potential of the pulse, becomes equal to a threshold electric potential of the MOS transistor, which changes in response to the change in the electric potential of the pulse and is an electric potential at which the MOS transistor switches off.

3. The amplifier circuit of claim 1, wherein the MOS transistor is a thin film transistor.

4. The amplifier circuit of claim 1, wherein the signal line is a display signal line of a display device.

5. The amplifier circuit of claim 1, wherein the signal line is a display signal line in a pixel of a display device.

6. The amplifier circuit of claim 1, wherein the MOS transistor is configured to turn off at different points of the transition period of the pulse in response to different levels of the received signal so that differences between the levels of the received signal are increased.

7. An amplifier circuit comprising:
   a sampling transistor;
   a signal line to which a signal sampled by the sampling transistor is inputted;
   a MOS transistor receiving the sampled signal and comprising a gate connected to the signal line and a source and a drain that are connected together; and
   a pulse generation circuit generating a pulse and applying the pulse to the source and the drain of the MOS transistor, the pulse generating circuit changing an electric potential of the pulse during a transition period of the pulse so that the MOS transistor turns off during the transition period
   wherein the MOS transistor is conflaured to amplify the received sianal upon the application of the pulse to the source and drain of the MOS transistor.

8. The amplifier circuit of claim 7, wherein, during the change in the electric potential of the pulse, the pulse becomes equal to a threshold electric potential of the MOS transistor, which changes in response to the change in the electric potential of the pulse and is an electric potential at which the MOS transistor switches off.

9. The amplifier circuit of claim 7, wherein the MOS transistor is a thin film transistor.

10. The amplifier circuit of claim 7, wherein the signal line is a display signal line of a display device.

11. The amplifier circuit of claim 7, wherein the signal line is a display signal line in a pixel of a display device.

12. The amplifier circuit of claim 7, wherein the MOS transistor is configured to turn off at different points of the transition period of the pulse in response to different levels of the received signal so that differences between the levels of the received signal are increased.

13. An amplifier circuit comprising:
   a sampling transistor;
   a signal line to which a signal sampled by the sampling transistor is inputted;
   a first MOS transistor receiving the sampled sianal and comprising a source and a drain that are connected together so as to be connected to the signal line;
   a second MOS transistor receiving the sampled signal and comprising a gate connected to the signal line and a source and a drain that are connected together; and
   a pulse generation circuit generating a first pulse and applying the first pulse to a gate of the first MOS transistor, and generating a second pulse and applying the second pulse to the source and the drain of the second MOS transistor, the first pulse having an opposite polarity to the second pulse, the pulse generating circuit changing an electric potential of the first pulse during a transition period of the first pulse and changing an electric potential of the second pulse during a transition period of the second pulse so that the first and second MOS transistors turn off during the transition period, wherein the first and second MOS transistors are configured to amplify the received signal upon the application of the first pulse to the gate of the first MOS transistor and the second pulse to the source and drain of the second MOS transistor.

14. The amplifier circuit of claim 13, wherein, during the changes in the electric potential of the first pulse and the electric potential of the second pulse, the signal becomes equal to a threshold electric potential of the first MOS transistor, which is an electric potential at which the first MOS transistor switches off, and the second pulse becomes equal to a threshold electric potential of the second MOS transistor, which is an electric potential at which the second MOS transistor switches off.

15. The amplifier circuit of claim 13, wherein the MOS transistor is a thin film transistor.

16. The amplifier circuit of claim 13, wherein the signal line is a display signal line of a display device.

17. The amplifier circuit of claim 13, wherein the signal line is a display signal line in a pixel of a display device.

* * * * *